(12) United States Patent
Sun et al.

(10) Patent No.: US 9,218,521 B2
(45) Date of Patent: Dec. 22, 2015

(54) CASE AND DATA READ-WRITE ASSEMBLY USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zong-Yuan Sun, New Taipei (TW); Da-Hua Xiao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/546,467

(22) Filed: Nov. 18, 2014

(65) Prior Publication Data

US 2015/0169927 A1    Jun. 18, 2015

(30) Foreign Application Priority Data

Dec. 16, 2013    (CN) .......................... 2013 1 0685957

(51) Int. Cl.
*G06F 17/00* (2006.01)
*G06K 7/10* (2006.01)
*G06F 1/16* (2006.01)

(52) U.S. Cl.
CPC .......... *G06K 7/10881* (2013.01); *G06F 1/1628* (2013.01); *G06K 7/10009* (2013.01)

(58) Field of Classification Search
CPC .. A45C 11/00; A45C 2011/003; A45C 13/02; A45C 2013/025; G06F 2200/1633
USPC ......................................................... 235/375
See application file for complete search history.

(56) References Cited

U.S. PATENT DOCUMENTS

| 5,006,699 | A | * | 4/1991 | Felkner et al. | ........... 235/462.49 |
| 5,586,786 | A | * | 12/1996 | Su | .................................. 281/33 |
| 2005/0127157 | A1 | * | 6/2005 | Stemmle et al. | ............... 235/377 |
| 2006/0183518 | A1 | * | 8/2006 | Emano | ........................ 455/575.8 |
| 2012/0037285 | A1 | * | 2/2012 | Diebel et al. | .................. 150/165 |

FOREIGN PATENT DOCUMENTS

CN    102842154 A    * 12/2012

* cited by examiner

*Primary Examiner* — Thien M Le
*Assistant Examiner* — Tae Kim
(74) *Attorney, Agent, or Firm* — Novak Druce Connolly Bove + Quigg LLP

(57) ABSTRACT

A case includes a main body, a protective frame, and at least one fixing member. The main body includes a first mounting portion and a second mounting portion rotatably connected to the first mounting portion. The protective frame is disposed on boundaries of the first mounting portion. The at least one fixing member is mounted on the first mounting portion and the second mounting portion. The first mounting portion and the protective frame jointly define an accommodation space to receive a reader, the second mounting portion secures a portable electronic device communicating with and separates from the reader. The first mounting portion rotates relative to the second mounting portion to be secured on the second mounting portion via the at least one fixing member.

5 Claims, 5 Drawing Sheets

CASE AND DATA READ-WRITE ASSEMBLY USING THE SAME

FIELD

The disclosure generally relates to cases a data read-write assembly using the case.

BACKGROUND

Barcode readers are commonly used by businesses. A barcode reader may be integrated in a portable electronic device and can scan the barcodes to obtain a package serial number. Additionally, related package information (for example, destination or telephone numbers) can be edited using the portable electronic device, and then the package serial number and the related package information can be sent to a terminal server. However, such a barcode reader is not easy to remove or reinstall if the barcode reader malfunctions.

BRIEF DESCRIPTION OF THE DRAWINGS

Implementations of the present technology will now be described, by way of example only, with reference to the attached figures.

DETAILED DESCRIPTION

Figure 1:
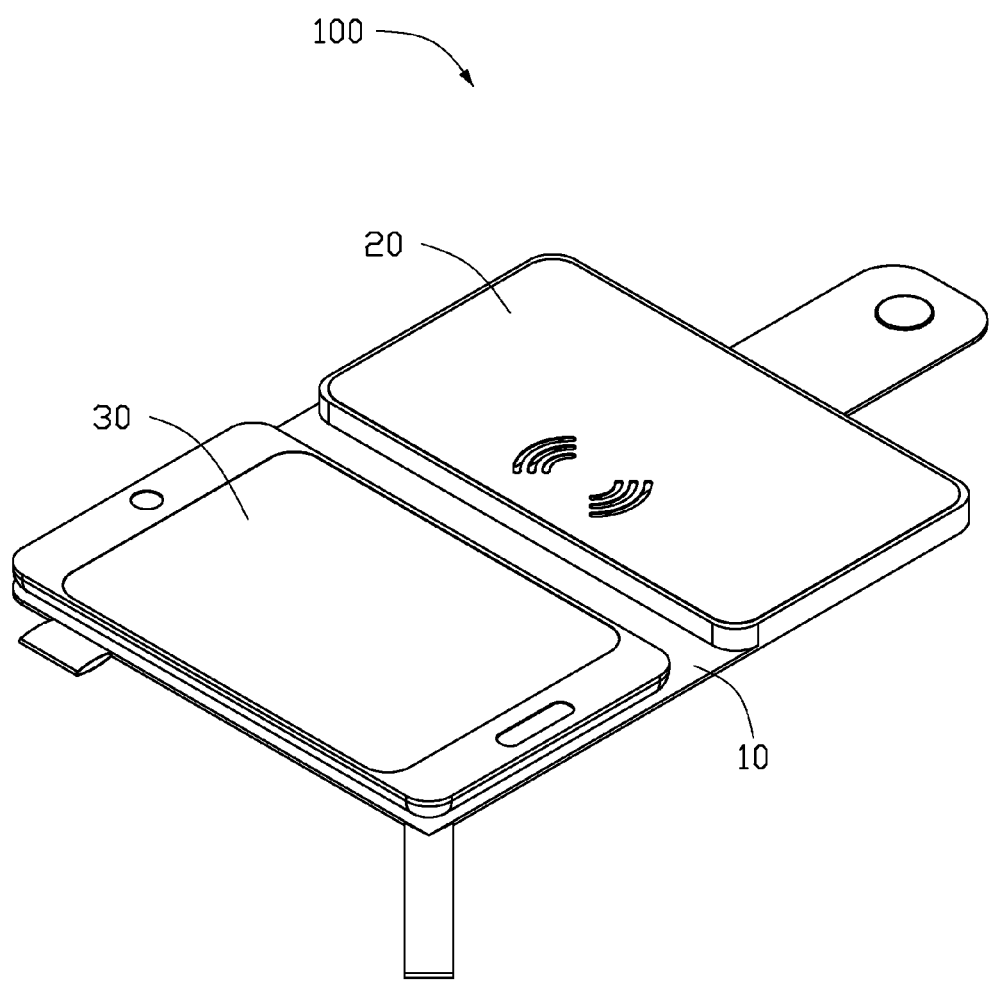
FIG. 1 is an assembled, isometric view of a data read-write assembly, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a case and a data read-write assembly using the same.

Figure 5:
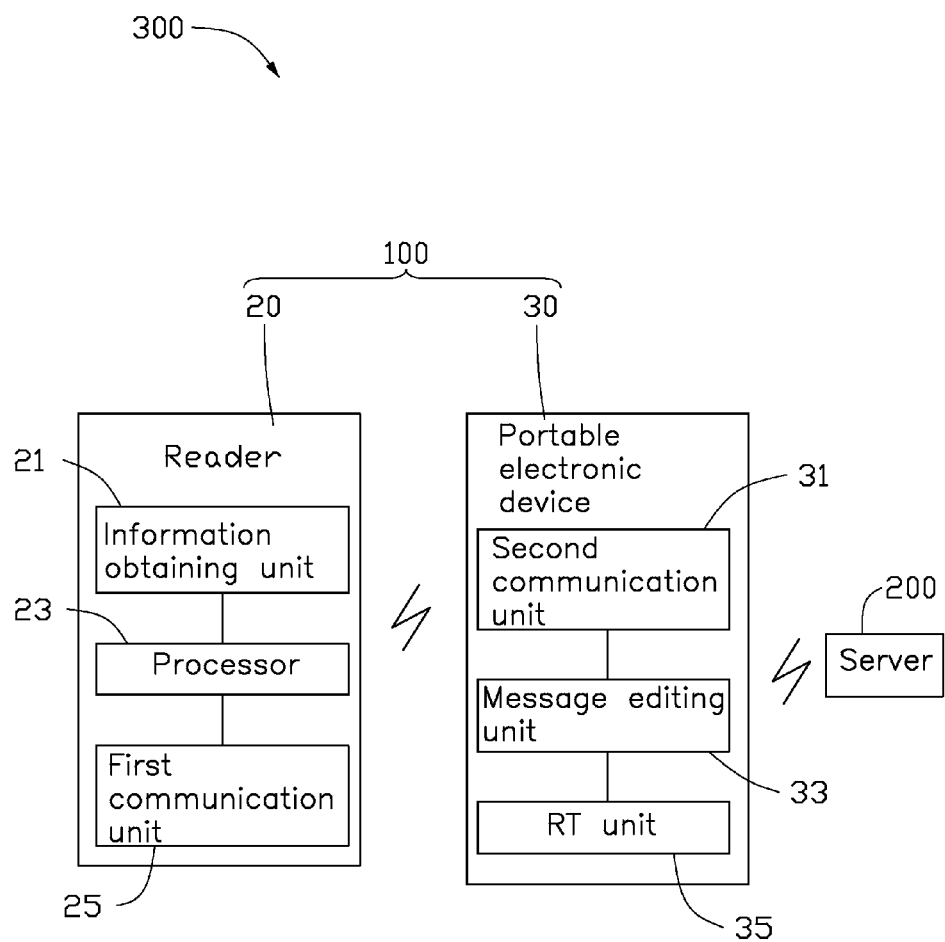
FIG. 5 is a block diagram of an information processing system employing the data read-write assembly of FIG. 1.

FIGS. 1 and 5 illustrate an embodiment of a data read-write assembly 100, according to an exemplary embodiment. The data read-write assembly 100 employed in an information processing system 300 to read barcodes, two-dimension codes, or radio frequency identification (RFID) tags on a package bill to obtain information such as a package serial number. The information processing system 300 further includes a server 200 communicating with the data read-write assembly 100.

In at least one embodiment, the data read-write assembly 100 includes a case 10, a reader 20, and a portable electronic device 30. The reader 20 and the portable electronic device 30 are received in two sides of the case 10 and communicate with each other. The portable electronic device 30 can be a mobile phone, a tablet, or an intelligent watch, for example (details not shown).

Figure 2:
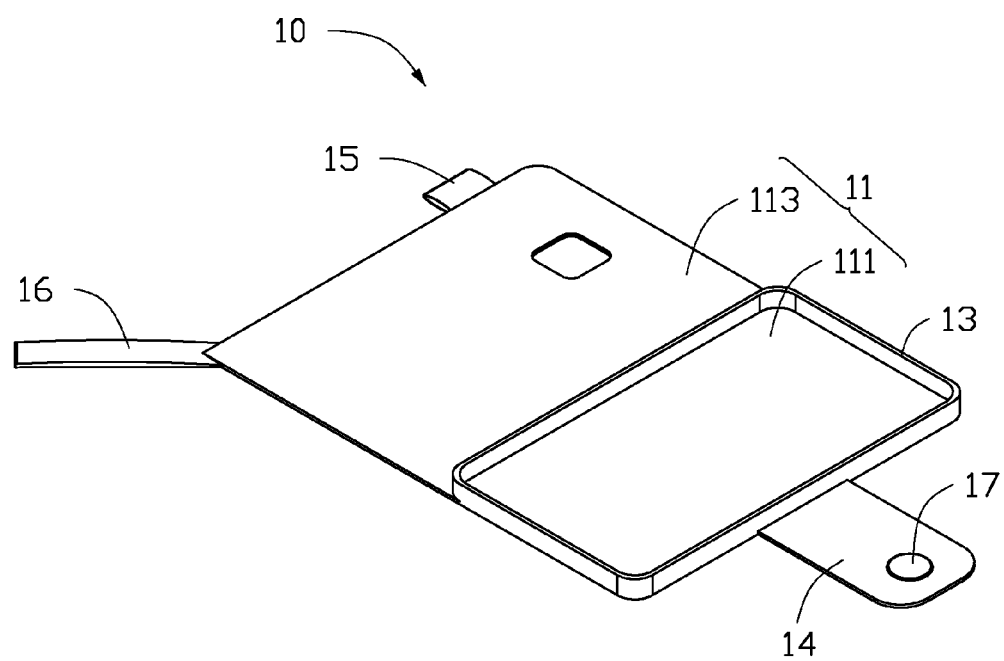
FIG. 2 is an isometric view of a case of the data read-write assembly of FIG. 1.
Figure 3:
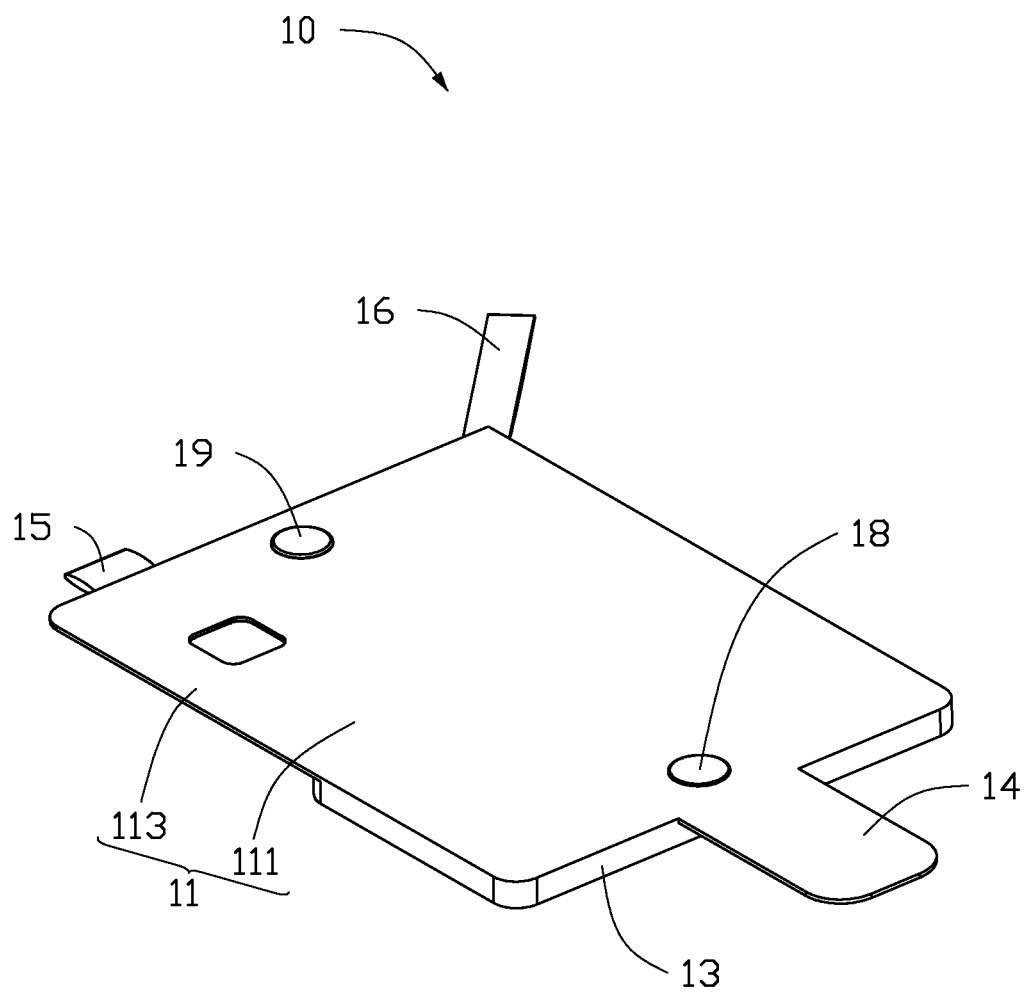
FIG. 3 is similar to FIG. 1, but shown from another angle.

FIGS. 2-3 illustrate an embodiment of the case 10, according to an exemplary embodiment. The case 10 can be made of leather materials, and includes a main body 11, a protective frame 13, a latching member 14, a ring 15, a hanging ornament 16, a first fixing member 17, a second fixing member 18, and a third fixing member 19.

The main body 11 forms a first mounting portion 111 and a second mounting portion 113 rotatably connected to the first mounting portion 111. In at least one embodiment, both the first mounting portion 111 and the second mounting portion 113 are substantially a rectangular board. The first mounting portion 111 rotates relative to the second mounting portion 113 to cover the second mounting portion 113 or to be folded on the second mounting portion 113, and vice versa. The protective frame 13 can be made of metal materials or plastic materials, and is disposed on boundaries of the first mounting portion 111 to define an accommodation space to receive the reader 20. The latching member 14 extends from the first mounting portion 111 and is disposed on a side of the protective frame 13. The ring 15 is disposed on a side of the second mounting portion 113 to receive a pen. The hanging ornament 16 is tied to the second mounting portion 113 to facilitate carrying of the data read-write assembly 100.

Figure 4:
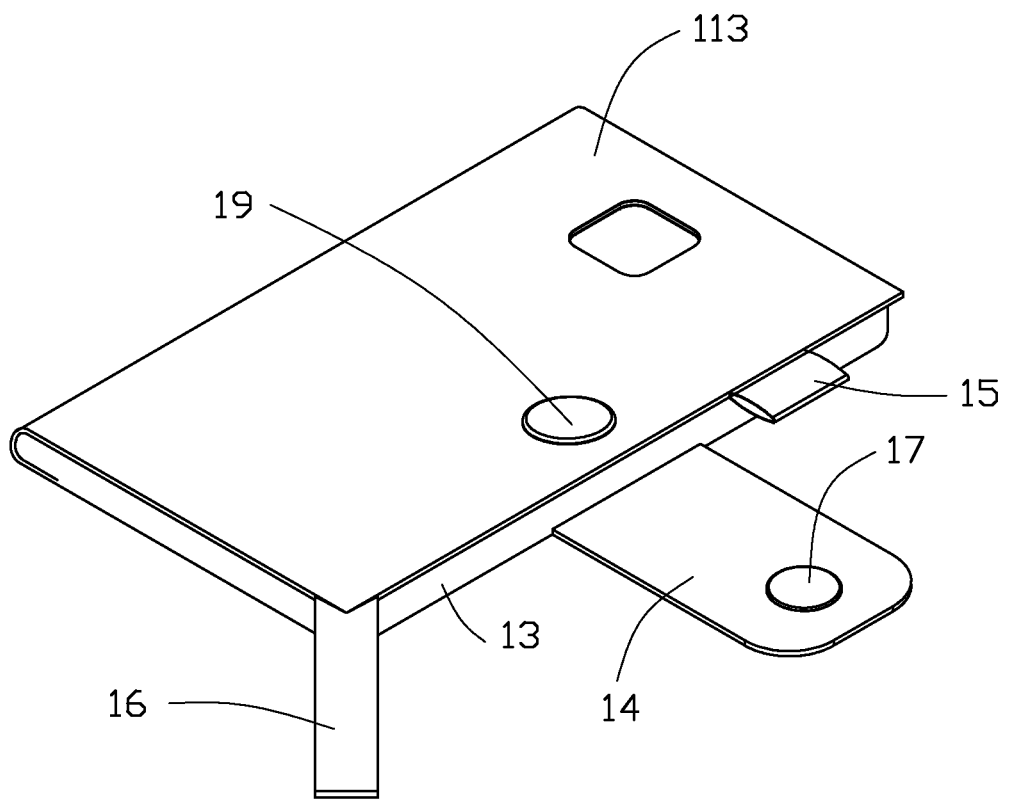
FIG. 4 is an isometric view of a case of FIG. 1 in a folded state.

The first fixing member 17 is located at the latching member 14. The second fixing member 18 is disposed on a surface of the first mounting portion 111 opposite to the protective frame 13. The third fixing member 19 is disposed on the second mounting portion 113. When the main body 11 is in an opened state, the second fixing member 18 is substantially aligned with the third fixing member 19. In at least one embodiment, all of the first fixing member 17, the second fixing member 18, and the third fixing member 19 can be magnets. Also referring to FIG. 4, when the first mounting portion 111 covers the second mounting portion 113, the first fixing member 17 attracts the third fixing member 19, thereby securing the latching member 14 on the second mounting portion 113. Similarly, when the first mounting portion 111 is reversely rotated to be folded on the second mounting portion 113, the second fixing member 18 attracts the third fixing member 19.

Referring to FIG. 5, the reader 20 and the portable electronic device 30 are interconnected via wireless communication signals. In at least one embodiment, the reader 20 can be operated at a high frequency mode, a ultra high frequency mode, or a central frequency of about 2.4 GHz. The reader 20 includes an information obtaining unit 21, a processor 23, and a first communication unit 25. The information obtaining unit 21 reads barcodes, two-dimension codes, or radio frequency identification (RFID) tags on a package bill. The processor 23 decodes the barcodes, two-dimension codes, or the RFID tags to obtain information such as a package serial number. The first communication unit 25 transmits the information decoded by the processor 23 to the portable electronic device 30.

The portable electronic device 30 includes a second communication unit 31, a message editing unit 33, and a transmit/receive (RT) unit 35. The second communication unit 31 communicates with the first communication unit 25 to receive the information. The message editing unit 33 edits the information by adding related package information (for example, destination or telephone numbers) to create a message. The RT unit 35 transmits the message to the server 200. In addition, the message can be saved in the server 200 to facilitate inquiring.

In at least one embodiment, the first communication unit 25 and the second communication unit 31 can be a near field communication unit, such as a BLUETOOTH® unit or a wireless fidelity (WIFI®) unit, for example. The RT unit 35 can be a global position system (GPS) unit.

In other embodiments, the reader 20 and the portable electronic device 30 are interconnected via a cable, for example, an audio cable.

In assembly, the reader 20 is received in the protective frame 13, and the portable electronic device 30 is secured on the second mounting portion 113 by a feasible manner, such as by glue. When the data read-write assembly 100 is not in use, the first mounting portion 111 covers the second mounting portion 113, the first fixing member 17 attracts the third fixing member 19 to fix the latching member 14 to the second mounting portion 113, thereby securing the reader 20 and the portable electronic device 30.

In use, the first fixing member 17 disengages the third fixing member 19, the first mounting portion 111 is reversely rotated to allow the second fixing member 18 to attract the third fixing member 19. Thus, the reader 20 can be aligned with the portable electronic device 30. When the reader 20 and the portable electronic device 30 are actuated, the reader 20 reads the barcodes, two-dimension codes, or the RFID tags on a package bill, and then transmits information decoded from the barcodes, two-dimension codes, or the RFID tags to the portable electronic device 30. The portable electronic device 30 receives and edits the information to create a message. Thus, the message can be transmitted from the portable electronic device 30 to the server 200.

In summary, the reader 20 separates from the portable electronic device 30. Thus, both the reader 20 and the portable electronic device 30 can be easy to change when one of them is malfunctioned. Additionally, the reader 20 and the portable electronic device 30 are disposed on the first mounting portion 111 and the second mounting portion 113, respectively, thus, the case 10 can protect the reader 20 and the portable electronic device 30 from scratch. Further, the second fixing member 18 attracts the third fixing member 19 to allow the reader 20 to be aligned with the portable electronic device 30, and then reading the barcodes, two-dimension codes, or the RFID tags by the reader 20 and editing the message by the portable electronic device 30 can be simultaneously implemented. Therefore, the data read-write assembly 100 is both efficient and convenient.

The embodiments shown and described above are only examples. Many details are often found in the art such as the other features of the case and the data read-write assembly using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A data read-write assembly, comprising:
   a reader reading barcodes, two-dimension codes, or radio frequency identification (RFID) tags to obtain information;
   a portable electronic device receiving and editing the information; and
   a case, the case comprising:
   a main body comprising a first mounting portion and a second mounting portion rotatably connected to the first mounting portion, the first mounting portion and the second mounting portion having a first common surface and a second common surface opposite the first common surface;
   a protective frame disposed on boundaries of the second common surface of the first mounting portion; and
   at least one fixing member mounted on the first mounting portion and the second mounting portion;
   a latching member extending from the first mounting portion and disposed on a side of the protective frame;
   wherein the reader is received between the first mounting portion and the protective frame, the portable electronic device is secured on the second common surface of the second mounting portion and separates from the reader;
   wherein the first mounting portion rotates relative to the second mounting portion to be secured on the second mounting portion via the at least one fixing member, and
   wherein the at least one fixing member comprises a first fixing member, a second fixing member, and a third fixing member, the first fixing member is located at the latching member, the second fixing member is disposed on the first common surface of the first mounting portion opposite to the protective frame, the third fixing member is disposed on the first common surface of the second mounting portion, when the first mounting portion covers the second mounting portion, and the first fixing member attracts the third fixing member, and when the first mounting portion is reversely rotated to be folded on the second mounting portion, the second fixing member attracts the third fixing member to allow the reader and the portable electronic device to be completely exposed from the case.

2. The data read-write assembly as claimed in claim 1, wherein the case further comprises a ring and a hanging ornament, the ring is disposed on a side of the second mounting portion, the hanging ornament is tied to the second mounting portion.

3. The data read-write assembly as claimed in claim 1, wherein the reader comprises an information obtaining unit, a processor, and a first communication unit, the information obtaining unit reads barcodes, two-dimension codes, or RFID tags, the processor decodes the barcodes, two-dimension codes, or the RFID tags to obtain the information, the first communication unit transmits the information to the portable electronic device.

4. The data read-write assembly as claimed in claim 3, wherein the portable electronic device comprises a second communication unit, and a message editing unit, the second communication unit communicates with the first communication unit to receive the information, the message editing unit edits the information to create a message.

5. The data read-write assembly as claimed in claim 4, wherein the portable electronic device further comprises a transmit/receive (RT) unit, the RT unit transmits the message to a server.

* * * * *